INVENTORS
Wallace R. Fowlie
Joseph Bzdelik, Jr.
Paul S. Colecchi
Bruce C. Wanatowicz
By Ooms, McDougall and Hersh
Attys INVENTORS
Wallace R. Fowlie
Joseph Bzdelik, Jr.
Paul S. Colecchi
Bruce C. Wanatowicz
By Dome, McDougall and Hersh
Attys

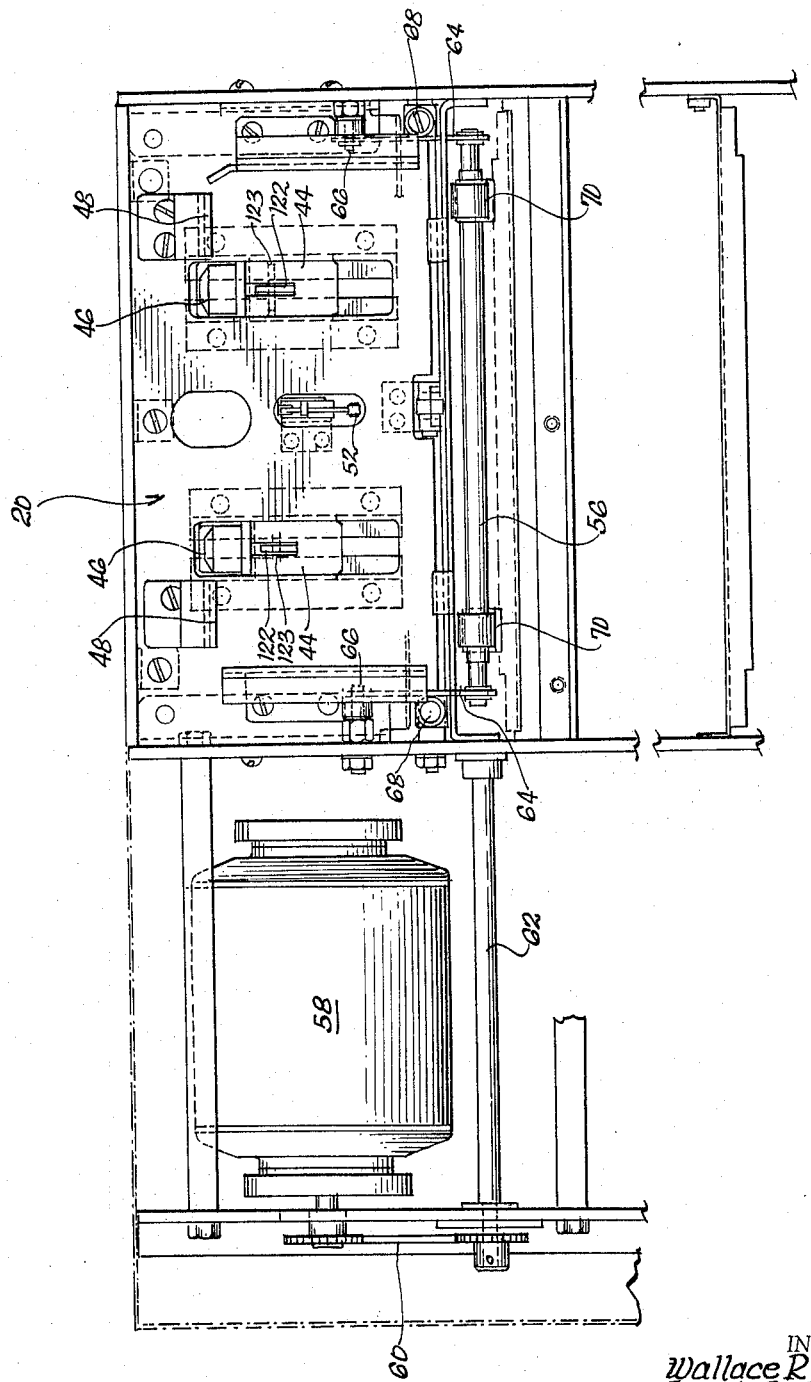

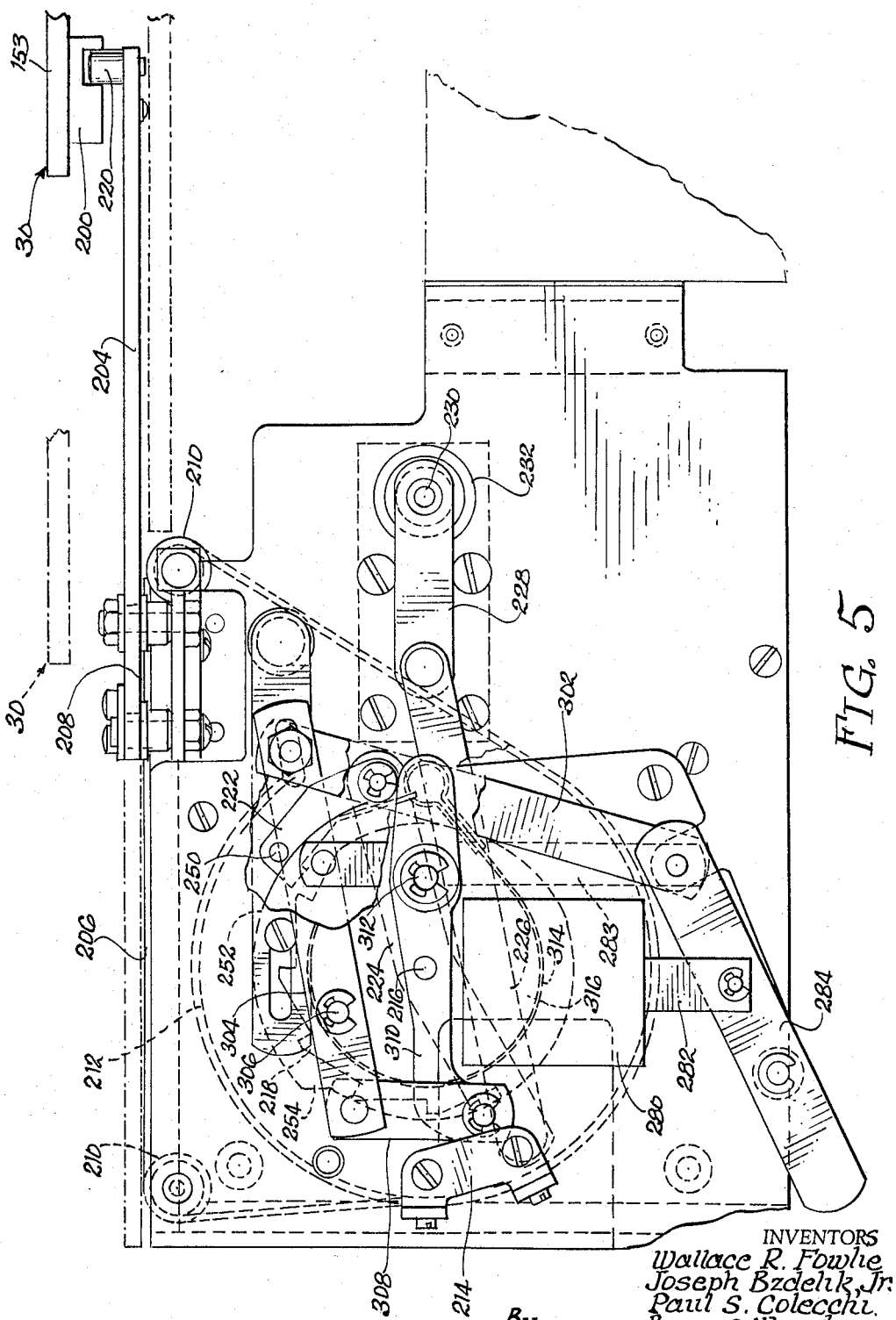

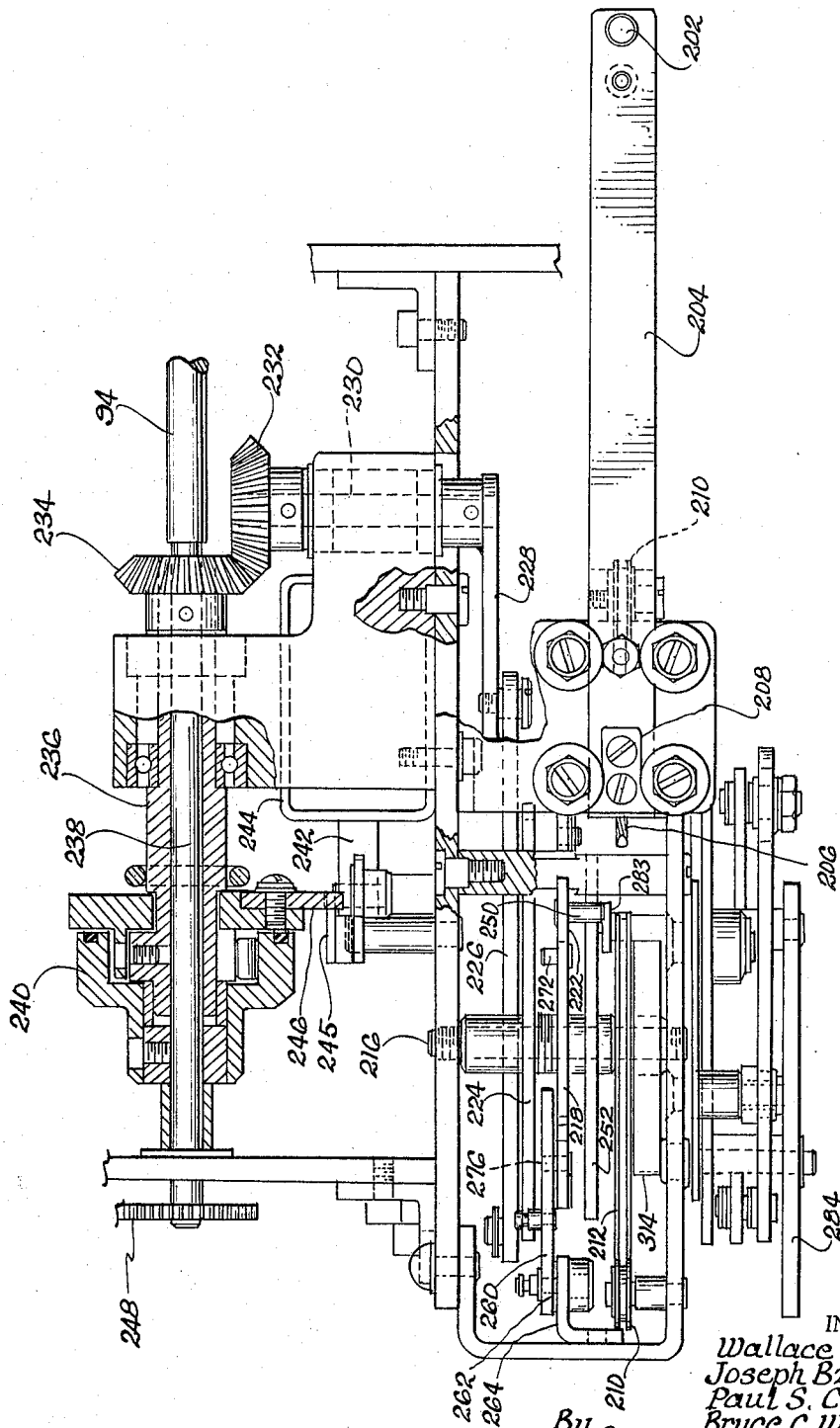

INVENTORS
Wallace R. Fowlie
Joseph Bzdelic, Jr.
Paul S. Colecchi
Bruce C. Wanatowicz
By Ooms, McDougall and Hersh
Attys Aug. 23, 1966  W. R. FOWLIE ETAL  3,267,797
APPARATUS FOR COPYING MATERIAL FROM PLURAL
POSITION ON A CORD
Filed June 18, 1963  9 Sheets-Sheet 8
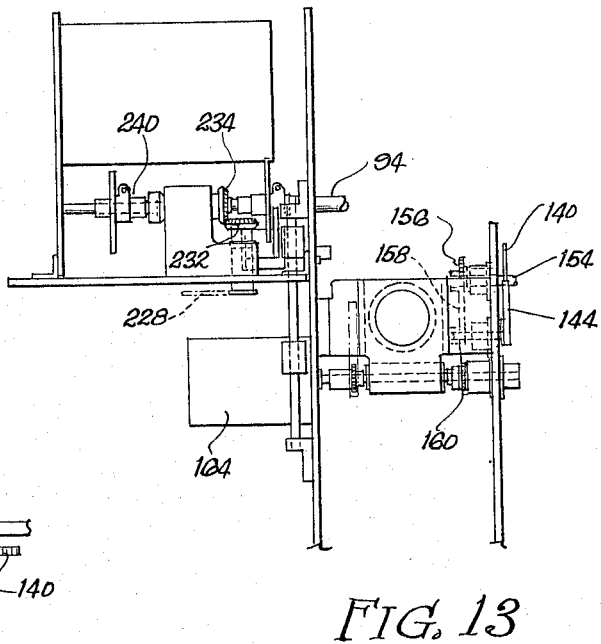
FIG. 13
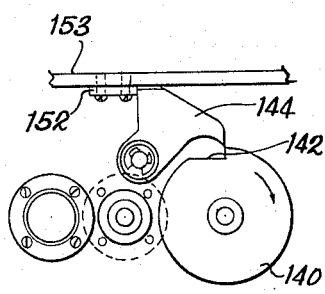
FIG. 11
FIG. 12
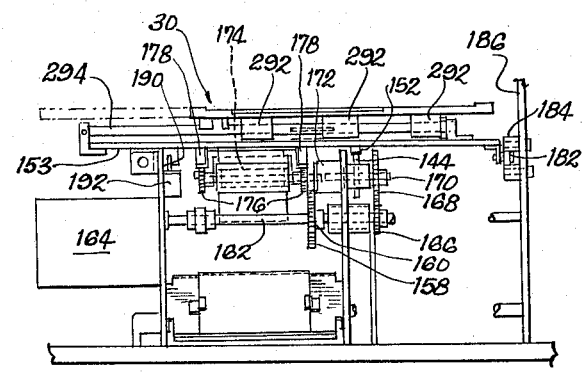
FIG. 14
INVENTORS.
Wallace R. Fowlie
Joseph Bzdelik, Jr.
Paul S. Colecchi
Bruce C. Wanatowicz
By Doms, McDougall and Hersh
Attys

United States Patent Office 3,267,797
Patented August 23, 1966

3,267,797
APPARATUS FOR COPYING MATERIAL FROM PLURAL POSITION ON A CORD
Wallace R. Fowlie, North Riverside, Joseph Bzdelik, Jr., Morton Grove, and Paul S. Colecchi and Bruce C. Wanatowicz, Chicago, Ill., assignors to A. B. Dick Company, Chicago, Ill., a corporation of Illinois
Filed June 18, 1963, Ser. No. 288,678
20 Claims. (Cl. 88—24)

This invention relates to a system for producing copy. In particular, the invention is directed to means for producing copy from relatively small material and to the methods for implementing these means.

It is well-known that a great many institutions have encountered problems regarding the volume of letters, documents, blueprints and the like which must be stored for indefinite periods. It is also well-known that such institutions have resorted to various copying techniques whereby these documents can be materially reduced in size and then stored in a relatively small space. A common procedure designed to overcome these problems involves the use of microfilm and the instant invention will be described with reference to material of this nature. It will be appreciated, however, that various other materials may be handled by the constructions of this invention to thereby take advantage of the inventive principles to be described.

The filing of microfilm, particularly where extremely large numbers of documents have been copied, presents many problems. A highly satisfactory manner of overcoming these problems comprises the use of punch cards of the type employed in automatic sorting machines. The microfilm can be mounted on such cards and the cards can be punched out in accordance with the necessary identification for the microfilm. The cards can then be filed in certain general categories, and when a particular microfilm is desired, all the cards in this category can be automatically sorted whereby the desired card or cards can be recovered.

It is an object of this invention to provide a copying system which is particularly suitable for use in combination with punch cards of the type described.

It is a more particular object of this invention to provide a copying system which is adapted to automatically provide for the production of copies of the material included in one or more microfilms mounted on punch cards of the type described.

It is a more particular object of this invention to provide an apparatus for automatically handling punch cards of the type described wherein the punch cards are disposed within a facsimile scanning arrangement of the type adapted to generate electrical facsimile signals.

These and other objects of this invention will appear hereinafter and for purposes of illustration but not of limitation, specific embodiments of this invention are shown in the accompanying drawings in which:

FIGURE 3 is a plan view illustrating the hopper construction for holding the cards and portions of the eject drive means therefor;

FIGURE 5 is an enlarged detail view of a portion of the platen drive means;

FIGURE 6 is a plan view of the platen drive means shown in FIGURE 5;

FIGURE 11 is a detail plan view of the carriage latch means utilized in the construction;

FIGURE 12 is an elevational view of the latch means shown in FIGURE 11;

FIGURE 13 is a plan view illustrating the relationship of various mechanisms for driving the platen carriage;

FIGURE 14 is an elevational view comprising an additional illustration of the platen carriage drive means;

General operation

Figure 15:
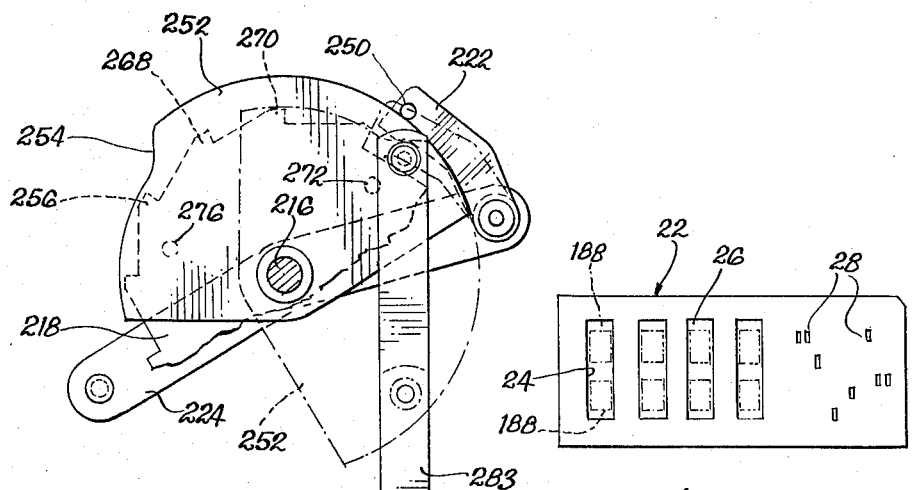
FIGURE 15 is a detail view of a punch card of the type contemplated for use in accordance with this invention.

The construction of this invention includes a hopper 20 which is utilized for holding a plurality of punch cards, for example, the type of card 22, shown in FIGURE 15. The card 22 comprises apertures 24 having microfilm strips 26 mounted therein. The conventional punched holes 28 are utilized to provide for identification of the cards whereby automatic sorting thereof is made possible.

Figure 1:
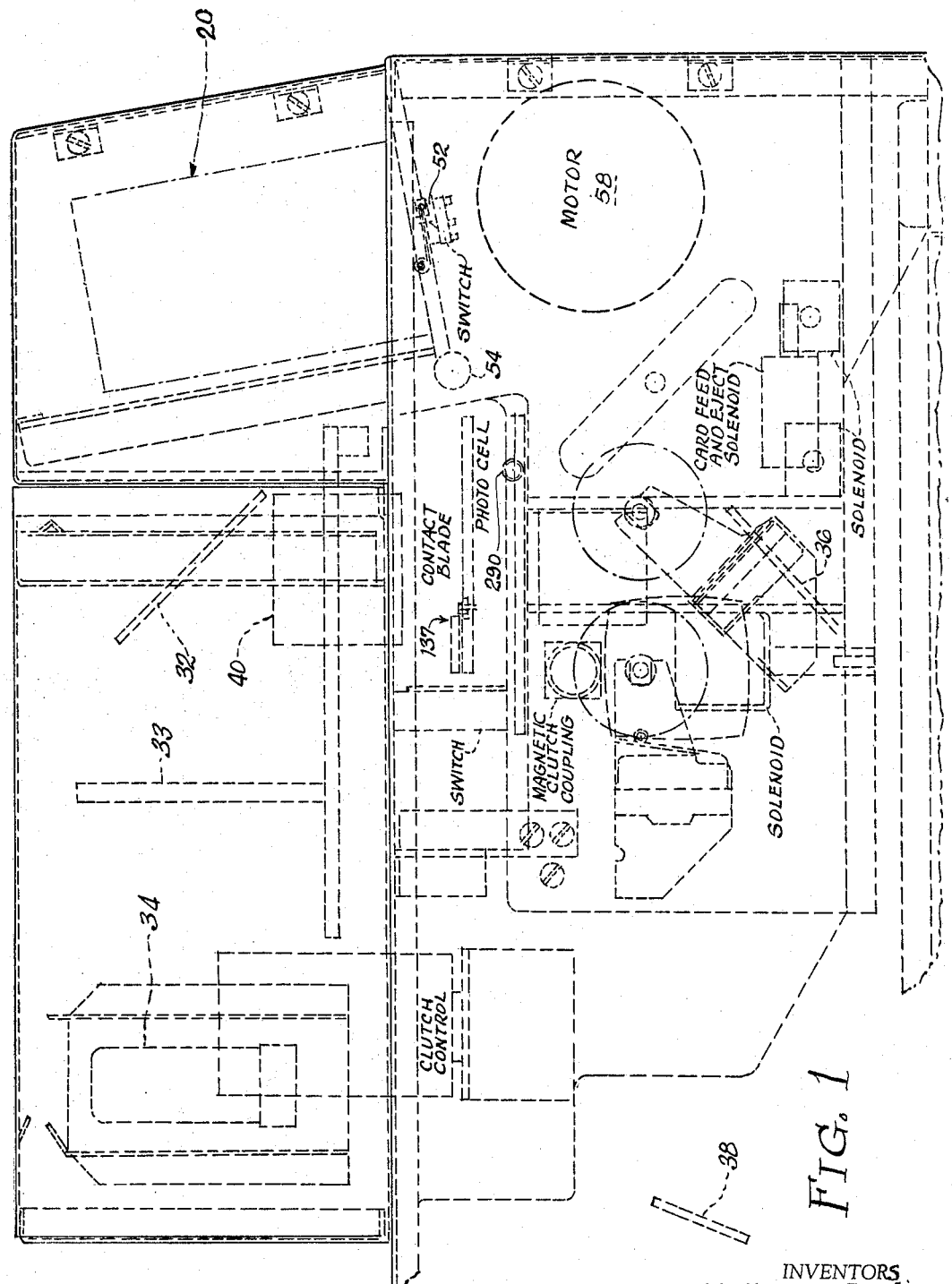
FIGURE 1 is a diagrammatic elevational view illustrating the relationship of the various components in the system of this invention.

The system of this invention is most advantageously employed where a plurality of cards are disposed in the hopper 20 and the mechanisms are adapted to rapidly and automatically remove these cards one at a time from the hopper whereby the material in the microfilms can be reproduced. Removal of a card from the hopper 20 results in placement of the card on a platen 30. The mirror 32 disposed above the platen provides for the reflection of light which is passed through lens 33 by means of light source 34. Light passing through the apertures in the card will be reflected by means of other mirrors in the unit such as the mirrors 36 and 38 (see FIGURE 1).

Figure 9:
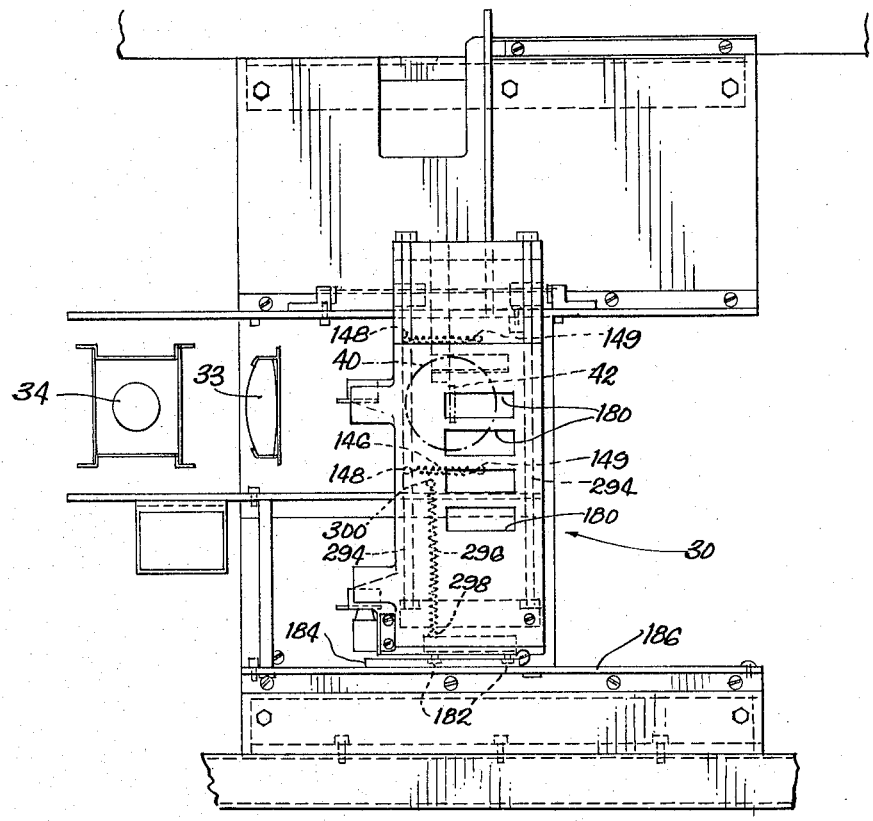
FIGURE 9 is a plan view illustrating the platen carriage construction.

Means are provided for moving the platen whereby successive portions of the microfilms are continuously exposed to the light. Cooperating with this construction, there is provided a housing 40 having a small slit 42 for passing light onto the microfilm (see FIGURE 9). For a more detailed explanation of a suitable scanning system, reference is made to copending application Serial No. 200,684, entitled Facsimile Scanning Machine, filed June 7, 1962. The machine described therein is adapted for the production of copy from standard size documents such as letters. The instant invention is adapted to provide copy of the same size due to the fact that a plurality of mirrors such as the mirrors 36 and 38 provides for enlargement of the image resulting when the microfilm is exposed to light. By increasing or decreasing the distance of throw of the image, the amount of magnification can obviously be controlled. A mirror system of the type illustrated presents advantages since a relatively great distance of throw can be accomplished within a limited space. It will be appreciated that the production of facsimile signals, if such is desired, which correspond to the image can be carried out in the same manner as described in the aforementioned copending application.

Card loading mechanism

In order to provide for movement of cards from the hopper 20 onto the platen 30, a pair of shuttles 44 are disposed at the bottom of the hopper. Each of these shuttles defines shoulders 46 and these shoulders are adapted to engage a card to move it out of the hopper when the shuttles are operated to move toward the platen. It will be understood that the height of the shoulders at their leading edge must be not more than the thickness of a card 22 to prevent movement of more than one card at a time. The shoulder can taper rearwardly as illustrated to facilitate separation.

Cards disposed in the hopper 20 are held in position through cooperation of the upstanding members 48, the inner wall 49 and the weight 50 provided on top of the stack of cards. A switch 52 is preferably disposed at the bottom of the hopper whereby the actuating mechanisms for the apparatus will not operate unless a card is in the hopper and provides for operation of this switch. It will be apparent that when the shuttles 44 are moved forward, the leading end of the lowermost card will be engaged between rollers 54 and 56. The roller 54 is driven by means of a motor 58 (see FIGURE 3). The motor 58 operates a gear train 60 which is connected to the roller 54 by means of the shaft 62.

The ends of the roller 56 are connected to arms 64 which are in turn pivotally connected at 66 to the housing of the apparatus. The roller 56 is urged downwardly by springs 68 whereby the gripping rings 70 on the roller will be urged against the surface of the roller 54 or against a card inserted therebetween. With this arrangement, a positive driving action is imparted to a card whereby it will be fed through these rollers. The roller 54 is preferably driven rapidly whereby the card held thereby will be rapidly transported to the platen assembly. A rapid speed will also effect throwing of the card to insure as much as possible proper alignment on the platen.

The platen 30 is provided with a cover frame 72 which has a tongue 74 extending angularly upwardly from its rear end. When the platen 30 is in the position shown in FIGURE 2, the tongue 74 is adapted to be engaged by a stationary stud 76 whereby the frame 72 will be pivoted about the connections 73. As will appear, this operation takes place when the platen is positioned for receiving a new card. The positioning of the platen in the receiving position is synchronized with the operation of the shuttles 44 so that the cover frame 72 will be raised when a card is fed between the rollers 54 and 56. The cover frame should be heavy enough to hold the card essentially flat on the platen.

Figure 4:
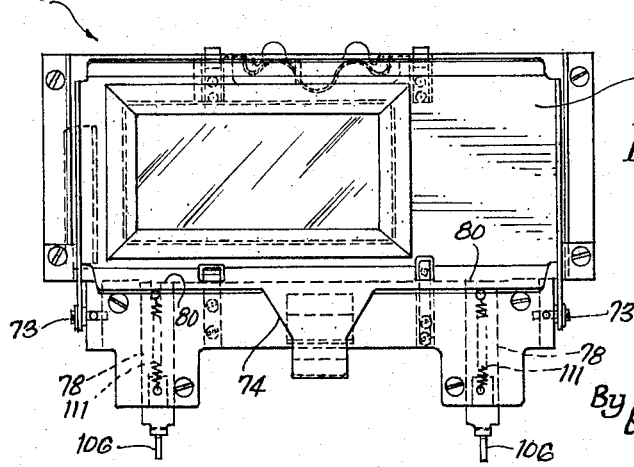
FIGURE 4 is a plan view of the platen construction utilized for holding the cards during the scanning operation.

It is necessary to provide means for removing a card from the platen 30 before the next card is positioned on the platen. These means include pushers 78 having ends 80 adapted to extend into the area of the platen normally occupied by a card (see FIGURE 4). These ends 80 are adapted to engage the edge of a card on the platen whereby the card will be moved into the nip of the rollers 54 and 82. The roller 82 is mounted on a pair of arms 79 and these arms are pivoted at 81 and urged upwardly by means of springs 83. The roller 82 is driven through the roller 54 in the same manner as the roller 56 whereby a card to be ejected will be passed into the hopper 84.

Figure 2:
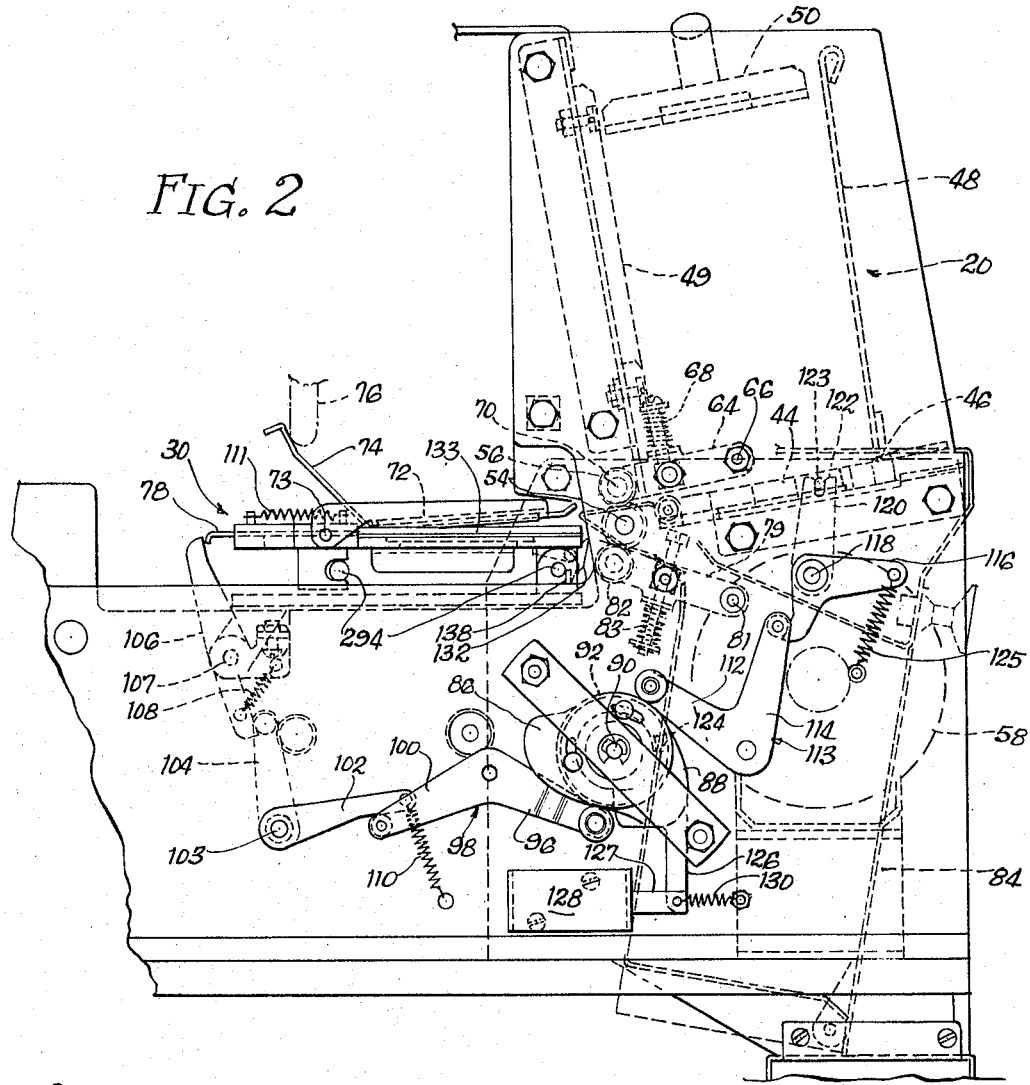
FIGURE 2 is an enlarged fragmentary elevational view of the card positioning mechanisms.
Figure 16:
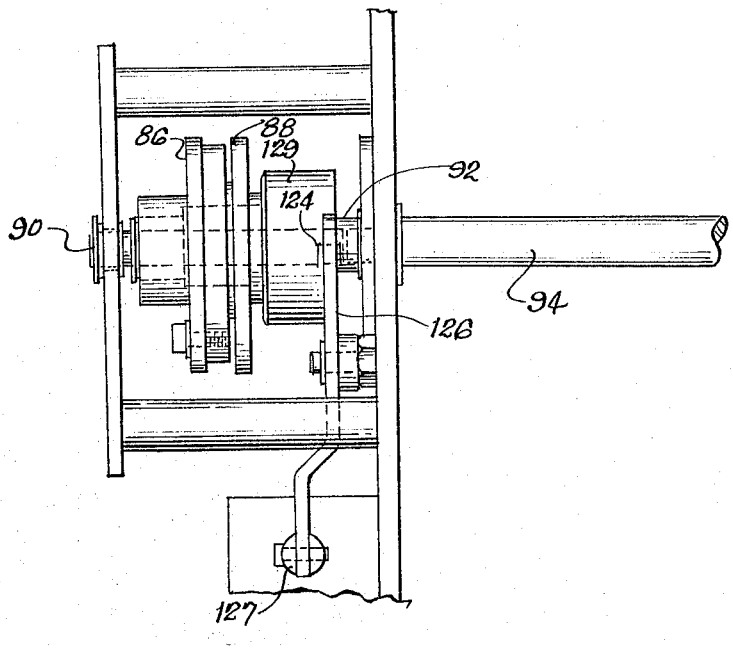
FIGURE 16 is a detail view illustrating the operating means for the card load and eject constructions; and, FIGURE 17 is a detail elevational view of positioning means for use in combination with the platen construction.

FIGURES 2 and 16 illustrate the mechanisms which are provided for moving the shuttles 44 and the pushers 78. These means include a pair of cams 86 and 88 which are mounted on a hub 90. The hub 90 is driven through a one revolution clutch 92 by means of the drive shaft 94.

The cam 86 is operatively engaged with an arm 96 on lever 98. The other arm 100 of this lever engages arm 102 which is mounted on the shaft 103 along with arm 104. When the arm 102 operates to oscillate the shaft 103, the arm 104 pivots push lever 106 about its connection 107. The lever 106 in turn engages the pusher 78 to effect ejection of a card in the manner described. Return springs 108 and 110 are provided whereby these means will return to their normal positions when the arm 96 moves off the rise in the cam 86. Springs 111 normally hold the pushers in a retracted position.

The cam 88 is operatively connected to the arm 112 of the lever 113 and pivoting of this lever results in engagement by the arm 114 with lever 116. This engagement imparts oscillatory movement to the shaft 118 which is tied to the lever 116. The members 120 also tied to this shaft define bifurcated ends 122 and these ends receive pins 123 associated with the shuttles 44. It will be apparent that engagement of the lever 113 with the rise of the cam 88 will impart forward movement to the shuttles 44 while the return spring 125 will operate to return the shuttles when the lever moves off this rise.

As previously noted, a one revolution clutch 92 is provided whereby continued revolution of the shaft 94 will not effect more than one revolution of the hub 90. Locking movement of the hub 90 is effected by means of the engagement of the latch 126 with the shoulder 124 formed in the fitting 129. The latch 126 provides for release of the hub 90 when the core 127 of the solenoid 128 is pulled in in opposition to the action of spring 130. It will be apparent that the operation of the card eject and feed mechanisms can be synchronized whereby the card in the platen will be received between the rollers 54 and 82 before the next card is in place within the platen.

*Platen scanning drive mechanism*

Figure 17:
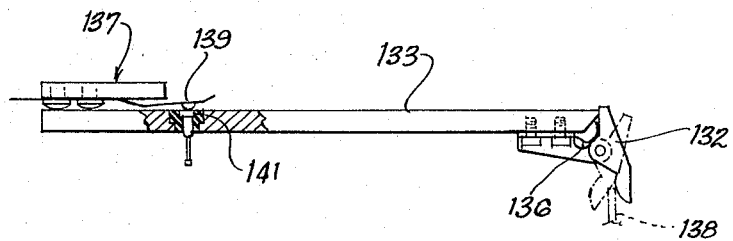

After placement of a card 22 in the platen assembly, means are provided for insuring accurate positioning of the card before initiating of a scanning operation and these means are shown in FIGURES 2 and 17. The positioning means comprise fingers 132 which are pivotally mounted to the card carrying portion 133 of the platen assembly 30. Springs 136 normally urge these fingers to the dotted line position shown in FIGURE 17. A stationary projection 138 which is secured to the housing of the apparatus is located to engage the lower ends of the fingers when the platen is moved away from the load and eject position. The fingers are thus moved to the solid line position shown in FIGURE 17 where they engage the trailing edge of a card 22 if the card has not moved completely onto the platen. The spring 136 is provided whereby the fingers will be moved out of the way to clear a path for ejection and insertion of a new card when the platen assembly is again moved to the eject and load position. A switch 137 may be provided so that scanning will not begin unless a card has broken its contacts 139 and 141.

Figure 10:
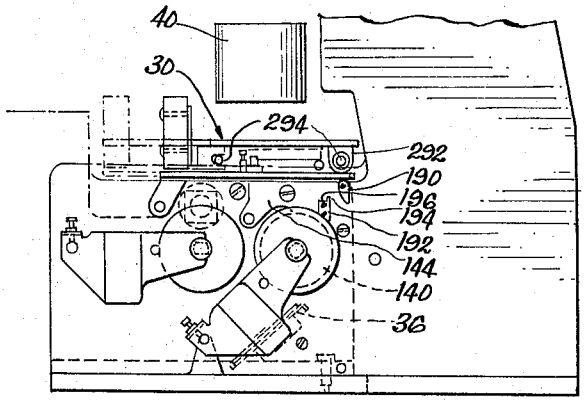
FIGURE 10 is an elevational view of the construction shown in FIGURE 9.

The movement of the platen is effected by means of a wheel 140 illustrated in FIGURES 10, 11 and 12. The wheel, which is shown in its position at the end of a scanning cycle, is provided with a cutout 142 which is adapted to receive the end of a pivotally mounted member 144. This member engages an associated member 152 which is fixed to the underside of plate 153, this plate forming a part of the platen assembly 30. When the member 144 falls into the cutout 142, the plate 153 is free to move toward the eject and load position. Springs 146 (see FIGURE 9) are fixed at one end 148 to the underside of the plate 153. The other end 149 of these springs is fixed to stationary posts whereby these springs will effect movement of the platen assembly toward the eject and load position when the member 144 falls into cutout 142.

The cam 140 is mounted on a shaft 154 (see FIGURE 13) which in turn is driven by gear 156. The gear 156 engages gear 158 which in turn is driven by gear 160 mounted on the shaft 162 (see FIGURE 14). A motor 164 is provided for driving this shaft.

A gear 166 is also tied to the shaft 162 and this gear drives a second gear 168 and associated shaft 170. The shaft 170 extends into a magnetic clutch 172 which, when energized, provides for driving of shaft 174. Pinions 176 are tied to this latter shaft and these engage racks 178 which are fixed to the underside of the plate 153.

The clutch 172 is energized after the cam 140 and member 144 have provided for movement of the plate 153 away from the eject and load position. This provides for driving movement of the platen assembly whereby light through slot 42 will scan microfilm in one aperture of a card 22. It will be noted that openings 180 are defined in the platen assembly to permit passage of light therethrough.

The plate 153 is provided with rollers 182 which ride in a track 184 fixed on a wall 186 of the housing. The platen assembly is thus adapted to move whereby the entire aperture of the card will be traversed.

It will be noted that the card 22 shown in FIGURE 15 carries microfilm 26 having space for two letter positions 188 therein. Where the apparatus of this invention is to be utilized in combination with a printing mechanism as described in the aforementioned copending application, it is desirable to provide means for de-energizing the clutch 172 between scanning of the first letter position and scanning of the second letter position. Thus, the printing mechanisms, due to the size of paper employed or to the cutoff sequence thereof, may require a delay in the scanning until the next section of copy material is in position to commence copying of the second letter position.

A timer mechanism is preferably associated with the magnetic clutch whereby it will be operated for a given interval of time and then become de-energized for the desired delay period and then be re-energized to begin the second letter position when new copy is ready. Means are provided for preventing return of the platen assembly during this interval when the clutch 172 is de-energized. These means include a finger 190 (FIGURE 10) which is pivotally connected to the plate 153. A stationary member 192 having an upwardly directed projection 194 is located in the path of the finger 190 whereby the finger will ride over this member in the course of scanning of the first letter position. A level portion 196 defined rearwardly of the projection 194 will be reached by the end of the finger 190 by the time the clutch 172 is de-energized. Therefore, the end of the finger 190 will engage the projection 194 to prevent return movement of the platen assembly. When the clutch is re-energized and the platen assembly moves to complete scanning of the second letter position, the finger 190 will move completely beyond the member 192 and, therefore, when the clutch 172 is again de-energized, the finger will ride completely over the member 192 during return movement of the platen.

*Platen shifting mechanism*

After completing scanning of an aperture in the card 22, means are provided for shifting the platen assembly whereby the next aperture will move into position for scanning. These mechanisms, shown in FIGURES 5 through 8, include a fitting 200 which is fixed to the underside of the portion 153 of the platen. A stud 202 located on the end of a bar 204 is received in the interior of this fitting whereby lateral movement of the bar will effect sliding movement of this portion 153.

Movement of the bar 204 is effected through a cable 206 which is fastened to the bar by means of a clamp 208. The cable extends over guide rollers 210 and around a disc 212. The cable is tied to this disc by clamp means 214 and the disc is tied to the shaft 216. Accordingly, when this shaft 216 rotates, the concurrent rotation of the cable will effect movement of the platen portion 153.

Movement of the shaft 216 and the associated disc 212 is effected through rotation of ratchet 218 which is tied to this shaft. A pawl 222 is pivotally connected to lever 224 which in turn is connected through link 226 and arm 228 to shaft 230. Bevel gears 232 and 234 provide for driving of this shaft.

The bevel gear 234 is tied to the sleeve-type shaft 236 and this shaft is attached to internal shaft 238 through a clutch 240. This clutch is operated when the core 242 of the solenoid 244 is pulled in. The core is associated with a member 245 which normally engages blocking pin 246, the latter being connected to the mechanical clutch. The solenoid 244 is operated by means of a momentary electrical pulse whereby the member 245 will return to its blocking position after releasing the pin 246, and, therefore, only a single revolution of the shaft 236 and associated bevel gears is permitted.

The shaft 238 comprises an extension of the shaft 94 previously discussed with reference to the card eject and load operation. A gear 248 is provided on the end of this shaft and this gear is operatively connected to the motor 58 whereby the shafts 238 and 94 will be continuously driven so that the clutch mechanisms associated therewith can be operated to effect the desired movements. Since both of these clutches are operated in response to the energization of solenoids, they can be operated in accordance with a timed sequence.

The pawl 222 is provided with a pin 250 which extends outwardly from one side thereof and which rides on the edge of a cam 252. This cam is provided with a relieved portion 254, and as shown in dotted lines in FIGURE 8, the pawl is adapted to engage a tooth of the ratchet when the pin 250 is received in the relieved portion of the cam.

Figure 8:
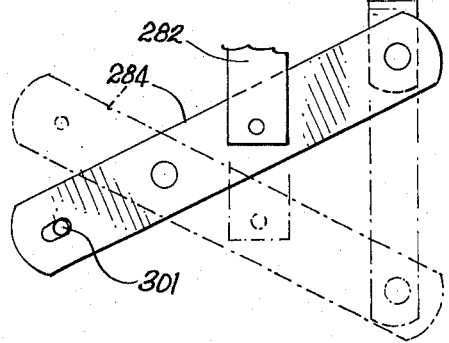
FIGURE 8 is an additional detail view of the ratchet construction and associated mechanism.

In order to move the platen portion 133 a distance sufficient to bring a succeeding aperture into position for scanning, the solenoid 244 is pulled in whereby the bevel gears will operate to move arm 228 and link 226. The pawl 222 will ride along the edge of the cam 252 until the pin 250 is received in the relieved portion 254. The solid line position of the cam illustrated in FIGURE 8 represents its position after scanning of the first aperture. When the pawl 222 rides on the cam in this position, it will drop down to engage the tooth 256 of the ratchet. The pawl will continue to move in the same direction for a distance sufficient to rotate the disc 212 whereby the second aperture will be properly positioned. The rotary movement of the arm 228 continues to complete a 360° revolution and, accordingly, the pawl 222 will ride back on the cam in the latter portion of this revolution.

Figure 7:
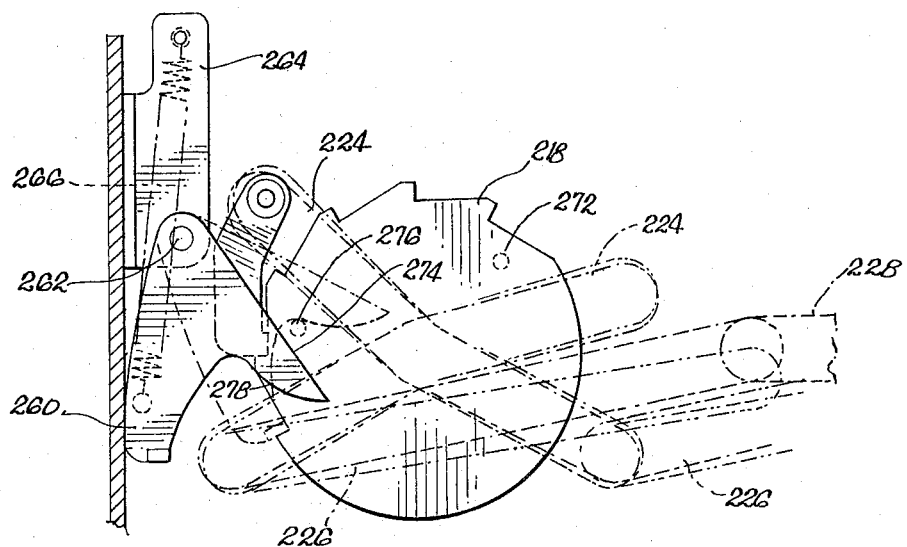
FIGURE 7 is a detail view of the ratchet construction utilized for the platen drive means.

FIGURE 7 illustrates a ratchet locking pawl 260 which operates to hold the ratchet in position after an indexing movement. The pawl 260 is pivotally connected at 262 to a fitting 264 attached to the frame of the apparatus. An over center spring 266 has one end attached to this frame and the other end attached to the pawl.

The pawl 260 is normally located in the dotted line position shown in FIGURE 7. When the pawl 222 effects an indexing movement, the tooth engaging portion of the pawl 260 will ride over the teeth of the ratchet and will then engage the tooth which the pawl 222 is pushing at the end of movement of this latter pawl. Accordingly, the ratchet will be held in place when the pawl 222 returns.

After positioning of the platen for the second scanning movement, the scanning will commence in the same manner as previously described and after completion of this scanning, the apparatus will set for the next shifting movement. If a third aperture is provided in the card 22, then the pawl 222 will engage the tooth 268 when the drive means for this pawl are operated. Similarly, the tooth 270 will be engaged by the pawl 222 if a fourth aperture is present in the card, therefore requiring a third indexing movement.

After completion of the scanning for the last aperture, the locking pawl 260 is adapted to be moved out of the way whereby the ratchet will return to the zero position in preparation for the scanning of a succeeding card. This movement of the locking pawl is effected by means of a pin 272 formed in the face of the ratchet and extending outwardly whereby it will engage the edge 274 of the pawl 260. Due to this engagement, the pawl will be swung to the solid line position shown in FIGURE 7 whereby it will not engage the teeth of the ratchet. As the ratchet returns to the zero position, the pin 276 formed in the face of the ratchet will engage the edge 278 of the pawl 260 to thereby return the pawl to the locking position.

Means are also provided for returning the ratchet to the zero position in the event that less than a maximum number of apertures are included on the card 22. In the illustrated embodiment, four apertures are provided, however, it will be understood that this arrangement is provided only as one suitable example. If less than four apertures are present in the card 22, a solenoid 280 is adapted to be operated whereby the core 282 thereof will pivot the arm 284 to thereby permit movement of the link 283 downwardly. This link is attached to cam 252 and the downward movement will swing the cam to the dotted line position shown in FIGURE 8. With this arrangement, the pawl 222 will engage the nearest ratchet tooth when driving movement is imparted to this pawl. The ratchet will swing to its extreme position whereby the pin 272 will move the pawl 260 away from the ratchet teeth. As the pawl 222 returns, the ratchet will automatically reset to its zero position.

In the construction illustrated, the solenoid 280 is in the de-energized state when the link 283 is in the dotted line position shown in FIGURE 8. A spring (not shown) attached to the housing of the apparatus will have its other end connected to the pin 301 whereby the arm 284 will automatically assume this dotted line position when the solenoid is de-energized. The energized position of the solenoid, shown in FIGURE 5, will be assumed immediately prior to each indexing movement. It is preferred that a photocell such as shown at 290 in FIGURE 1 be provided for detecting the presence of an additional aperture in the card whereby the energization of the solenoid 280 can be effected whenever an indexing movement is to take place. It will be appreciated that when the photosensitive element associated with the solenoid does not detect an additional aperture, the solenoid will remain in a de-energized state and, therefore, the pawl 222 will move the ratchet to dislodge the locking pawl 260 whereby the ratchet will be reset to the zero position.

The construction of this invention is preferably designed for high speed movement of the cards through the various operations whereby a maximum number of cards can be handled in a given interval of time. One high speed movement comprises the shifting of the platen from one aperture to the next, which movement is effected by means of the pawl 222 and the ratchet 218. When this high speed movement is effected, substantial intertia is built-up in these elements and there is a tendency for the ratchet to override whereby greater than a single indexing movement would be effected. To overcome this, a brake means is associated with these elements which is adapted to impart a drag in the system to overcome the effects of this inertia.

The brake means of this invention is actuated through a link 302 which is pivotally connected to the end of arm 284. This link is in turn connected to the arm 304 which pivots about the pin 306. A link 308 in turn connects the arm 304 to a member 310 which is pivoted about the pin 312. A band 314 is fastened to the end of the member 310. This band is wrapped around a drum 316, which is fixed to the shaft 216, and the opposite end of the band is fixed to a stationary stud (not shown).

When the solenoid 280 is energized as shown in FIGURE 5, the described linkage will effect tensioning of the band whereby a drag will be exerted on the drum 316. Since this solenoid is energized just prior to each indexing movement, this drag will offset the inertia of the rapidly moving indexing elements.

The portion 133 of the platen assembly 30 is provided with downwardly extending members 292 (see FIGURE 14) which receive rods 294. With this arrangement, shifting movement of this portion of the platen assembly can be readily accomplished. The return of the entire platen assembly to the starting position is effected by means of spring 296 (see FIGURE 9). One end 300 of this spring is secured to the underside of the platen portion 133 while the other end 298 is secured to a stationary pin mounted on plate 153. The platen assembly is then moved to the eject the load position as previously described, when the cam 140 permits release of the platen by the member 144.

Various means can be provided for synchronizing the movements of the various elements above described. As previously noted, timer mechanisms can be employed whereby each movement will take place in a timed sequence. In this connection, the timer mechanism can be associated with switching means whereby a new timing cycle will be automatically commenced as soon as the platen assembly has completed scanning of the microfilms in each aperture and has returned to the zero position. As an alternative arrangement for controlling the sequence of operation, various mechanical switches can be associated with elements such as the platen portion 133 to initiate the described operations. It will be understood that the manner in which the sequence of operations is controlled does not per se form a part of this invention and those skilled in the art will be capable of providing many control systems which are suitable for use in combination with the novel mechanisms described.

It will be understood that various changes and modifications may be made in the above described apparatus which provide the characteristics of this invention without departing from the spirit thereof particularly as defined in the following claims.

That which is claimed is:

1. An apparatus for the handling of material to be copied wherein said material is disposed in a plurality of separate positions on a mounting card, said apparatus comprising a hopper for retaining a plurality of said cards, a platen situated adjacent said hopper, card loading means for moving said cards one at a time from said hopper to said platen, means located adjacent said platen for scanning the material of the card located on the platen for effecting copying of the material, first drive means for moving said card and scanning means relative to each other during the copying operation, separate drive means for shifting said card after scanning of one of said positions whereby other positions on said card can be successively located for scanning, means for reactivating said first drive means for an additional scanning operation, means for alternately operating the respective drive means until scanning of all of said positions is completed, and card eject means for removing each card from said platen after completion of the scanning operation.

2. An apparatus in accordance with claim 1 wherein said hopper includes shuttle means movable along its bottom surface, card engaging portions on said shuttle means adapted to push one card at a time toward the scanning position, and roller means adapted to receive each card pushed by said shuttle means and adapted to pass said cards to the scanning position.

3. An apparatus in accordance with claim 2 including a second roller means for assisting in the removal of cards from said scanning position, and a second hopper disposed in communication with said second roller means for receiving cards so removed.

4. An apparatus in accordance with claim 2 including pusher means associated with said platen for engaging a card located thereon after completion of said scanning operation, and drive means for operating said pusher means and said shuttle means, said drive means including means for synchronizing movement of said pusher means and said shuttle means whereby said pusher means will initiate ejection of a card on the platen before placement of the next card thereon.

5. An apparatus in accordance with claim 4 wherein said sychronizing means comprise a pair of cam means mounted on a rotating shaft, and including pusher and shuttle actuating means operatively associated with said cam means.

6. An apparatus in accordance with claim 4 wherein said platen comprises a pivotally connected cover adapted to hold down a card positioned on the platen, and means for raising said cover to clear a path for removal and placement of cards on said platen.

7. An apparatus in accordance with claim 6 wherein said platen has a first position which is assumed during removal and placement of cards thereon, and including means associated with said apparatus for engaging said cover to automatically raise said cover when said platen is moved to said first position.

8. An apparatus in accordance with claim 4 including card positioning fingers associated with said platen, said fingers being provided for moving a card into the desired scanning position after placement of the card on said platen, said platen having a second position which is assumed before commencing the scanning operation, and means for actuating said fingers when said platen moves from said first position to said second position.

9. An apparatus in accordance with claim 1 including means for moving said platen from a scanning position to a card eject and load position after completion of scanning, and including common drive means for said card loading and card eject means whereby the operations are carried out in timed sequence.

10. An apparatus in accordance with claim 1 wherein said card loading means operate to throw the cards one at a time onto said platen whereby said cards are rapidly positioned on the platen, and including switch means for detecting the presence of a card on the platen thereby permitting subsequent operations.

11. An apparatus in accordance with claim 1 wherein said platen comprises an assembly provided for loading a card in the scanning position, said assembly including a card carrying portion and a mounting portion, said first drive means operating to move said assembly relative to said scanning means, and said separate drive means operating to move said card carrying portion of said assembly relative to said mounting portion to provide for said shifting from one position to another position.

12. An apparatus in accordance with claim 11 wherein said cards define a plurality of separate apertures and including microfilms disposed in each of said apertures.

13. An apparatus in accordance with claim 12 including detecting means associated with said platen, said detecting means being adapted to detect apertures in said card to thereby permit shifting of the card for purposes of scanning the microfilm in the detected aperture, and wherein said detecting means operates to discontinue the scanning operation and to initiate the card eject operation when additional apertures are not detected.

14. An apparatus in accordance with claim 12 wherein said first drive means for moving said assembly comprise rack means attached to said mounting portion, pinion means operatively connected to said rack means, motor means for driving said pinion means and a clutch means connected between said motor means and said pinion means.

15. An apparatus in accordance with claim 14 wherein the microfilm on said cards comprises strips carrying a plurality of separate areas of material to be copied, and wherein said clutch is adapted to be made inoperative intermediate the copying of respective ones of said areas, and means for locking said platen assembly in position during the time that said clutch is inoperative.

16. An apparatus in accordance with claim 12 wherein said platen has a first position which is assumed during removal and placement of cards thereon and a second position which is assumed before commencing of a scanning operation, and including means operated by said first drive means connected to said assembly for moving said assembly from said first position to said second position.

17. An apparatus in accordance with claim 12 wherein said separate drive means for moving the card carrying portion of said assembly comprises a ratchet, means operatively connecting said ratchet to said card carrying portion, a pawl, and operating means for moving said pawl into engagement with said ratchet for rotating said ratchet and for thereby moving said card carrying portion wherein the microfilm scanned will be moved away from the sacnning position.

18. An apparatus in accordance with claim 17 wherein said pawl includes a cam engaging member, a cam for holding said pawl out of engagement with said ratchet, a relieved portion in said cam, said pawl operating means being adapted to move said pawl relative to said cam until said cam engaging member reaches said relieved portion whereby said pawl will engage said ratchet and will move the ratchet a distance sufficient to dispose a succeeding microfilm in the scanning position.

19. An apparatus in accordance with claim 18 including a second pawl for locking said ratchet in position, means operatively associated with said ratchet for engaging said locking pawl when said ratchet has moved the card carrying portion to the extreme scanning position to thereby move said second means associated with said ratchet for engaging said second pawl during resetting movement of said ratchet for returning said second pawl to the locking position.

20. An apparatus in accordance with claim 19 including means operatively associated with said cam for moving the relieved portion of said cam adjacent the first mentioned pawl prior to operation of the means for moving said first mentioned pawl whereby movement of the first mentioned pawl will result in immediate engagement of said ratchet to thereby cause said ratchet to move said card carrying portion to said extreme position whereby resetting of said ratchet will result.

References Cited by the Examiner
UNITED STATES PATENTS

| | | | |
|---|---|---|---|
| 3,094,036 | 6/1963 | Benson | 88—24 |
| 3,137,202 | 6/1964 | Rutkus et al. | 95—1.7 X |

NORTON ANSHER, *Primary Examiner.*

R. A. WINTERCORN, *Assistant Examiner.*